United States Patent

Argent et al.

[15] 3,642,540
[45] Feb. 15, 1972

[54] METHOD FOR MAKING METAL-AIR CELL

[72] Inventors: Edwin John Argent, Pyrford, near Woking; Peter J. Gillespie, Basingstoke, both of England

[73] Assignee: Energy Conversion Limited, London, England

[22] Filed: Apr. 8, 1969

[21] Appl. No.: 814,367

[30] Foreign Application Priority Data

Apr. 25, 1968  Great Britain......................19,740/68

[52] U.S. Cl..................................136/175, 136/15, 136/86 A
[51] Int. Cl...................................H01m 29/04, H01m 43/00
[58] Field of Search......................136/86, 10, 15, 16, 74, 175

[56] References Cited

UNITED STATES PATENTS 3,266,936  8/1966  Krebs..................................136/36 X
3,378,406  4/1968  Rosansky..............................136/86

*Primary Examiner*—Allen B. Curtis
*Attorney*—Morgan, Finnegan, Durham & Pine

[57] ABSTRACT

A process for making a metal/air oxygen (air) battery is provided comprising the steps of applying two spaced-apart cathode layers, one adjacent one edge and one generally centrally disposed on one face of an air permeable sheet-form member of electrically conductive material, applying an anode layer on each surface adjacent the other edge of the sheet-form member, applying electrolyte-resistant absorbent material to the outer surfaces of the anode, folding the sheet-form member into a generally S-form configuration and interleaving with another similarly folded sheet-form member so that the two cathode layers which face one another have the anode layers of said other member therebetween and locating an air permeable electrically insulating separator between the adjacent uncoated surfaces of the sheet-form members.

2 Claims, 2 Drawing Figures

PATENTED FEB 15 1972 3,642,540

INVENTORS
EDWIN JOHN ARGENT
PETER JAMES GILLESPIE
BY
Morgan, Finnegan, Durham & Pine
ATTORNEY

METHOD FOR MAKING METAL-AIR CELL

This invention relates to electrochemical cells and more particularly to metal/oxygen (air) cells.

In accordance with one aspect of the invention a metal/oxygen (air) cell comprises a porous anode having applied to at least one surface thereof a layer of electrolyte-resistant absorbent material, catalytic cathode material being applied directly to said layer and current leads to said anode and to a current collector associated with said catalytic material.

Such a cell will operate when an electrolyte is supplied to the absorbent layer and oxidant (air) is supplied to the cathode. By making the various components of relatively cheap materials it becomes economic to throw away the cell after the useful anode material has been consumed; the cell is, then, a primary cell which can be made to any desired size. It is envisaged that this construction will be applicable more particularly, though not only, to cells of small power, for instance of the order of a few watts.

The catalytic material may be sprayed onto the absorbent electrolyte layer or it may be on the current collector that is pressed into the surface of said layer.

The construction can be used, for example, to form a battery where a plurality of cells are arranged in series. These cells may be formed one by one as layers, one next to the other, but in this construction it is necessary to interpose separators between adjacent cells that are pervious to oxidant gas to enable the gas to reach the backs of the cathodes in sufficient quantity to maintain depolarization thereof. Such a separator may comprise metal wool that is resistant to the electrolyte; stainless steel wool could form a useful separator.

Alternative separators may comprise nickel or silver wire wools and metallized plastics wool. Metallic separators have the additional advantage of serving as current collectors in contact with the cathodic material and, if the anode is not protected by insulating material, such as a plastics foil, electrical connection is made with the anode of the adjacent cell, thus serving to connect the cells in series. It is possible to back the anode alternatively with a metal foil, in which case the series connection can be made automatically as described. If the outer face of the anode is so protected, connection may still be made to the cathode by insertion of a current lead into contact with the metallic separator.

The foil backing, whether it be of metal or of plastics material, will serve also to avoid loss of electrolyte through the anode.

If cells are required to be insulated from adjacent cell it may be desirable to make the separator of nonmetallic material and for this purpose a gauze of plastics material, such as nylon, may be used; there is a proprietary gauze available, known under the name of Netlon.

Another possibility is to make a battery of bicells in which a series connection between the bicell element is made by wrapping the bicathode in a current connector which is an extension of a current collector of the anode of the adjacent element. A nonconducting separator/air permeator such as Netlon is then required between adjacent elements.

According to another aspect of the invention, there is provided a method of making a metal/oxygen (air) cell comprising applying a layer of electrolyte-resistant absorbent material to at least one surface of a porous anode, applying a catalytic cathode material directly to said layer and connecting current leads to said anode and to a current collector associated with said catalytic material.

According to a further aspect of the invention there is provided a method of making a metal/oxygen (air) battery comprising applying two spaced-apart cathode layers one adjacent one edge and one generally centrally disposed on one face of an air permeable sheet-form member of electrically conductive material, applying an anode layer on each surface, adjacent the other edge, of the sheet-form member, applying electrolyte-resistant absorbent material to the outer surfaces of the anode, folding the sheet-form member to a generally S-form configuration and interleaving with a further similarly folded sheet-form member so that the two cathode layers which face one another have the anode layers of the other member therebetween, an air permeable, electrically insulating separator being positioned between adjacent uncoated surfaces of the sheet-form members.

The sheet-form members may be produced by coating a conductive web and then cutting the web into separate lengths to produce the sheet-form members.

The foregoing and further features of the invention may be more readily understood from the following description of two preferred embodiments thereof, by way of example, with reference to the accompanying drawing, in which.

Figure 1:
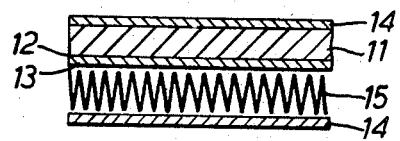
FIG. 1 is an end sectional view of a metal/oxygen (air) cell.

Referring now firstly to FIG. 1 there is shown a metal/oxygen (air) cell comprising a porous zinc anode 11 which has a layer of electrolyte-resistant absorbent material 12 applied directly on one surface thereof. A cathode 13 comprising catalytic cathode material is sprayed or pressed on to the layer 12. The other surface of the anode 11 carries a foil 14 to prevent loss of electrolyte; such foil 14 may be electrically insulating or conductive. An air permeable separator 15, which may be metal or plastics wool, is positioned between the cathode 13 and the foil 14 of the next adjacent cell. By making the foil 14 conductive and the separator 15 of stainless steel wool the cells of a battery are connected in series thereby. Electrolyte for the cell is contained within the anode 11 and layer 12 and a reservoir (not shown) may also be provided for supplying electrolyte thereto.

Figure 2:
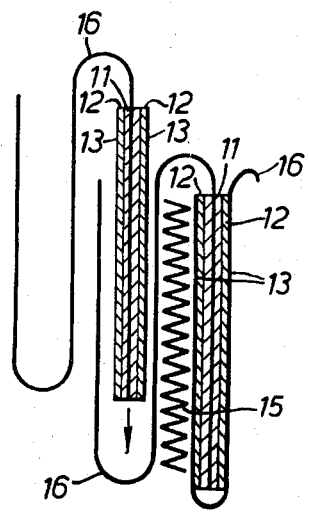
FIG. 2 is an end sectional view of a part of a metal/oxygen (air) battery during assembly.

Referring now to FIG. 2, there is shown two cells of a metal/oxygen (air) battery during assembly. In this embodiment the separator 15 is of an electrically insulating material, such as nylon. The anodes 11 do not require a foil layer 14 since a layer 12 and cathode 13 are positioned one on each surface of each anode 11. Each cell is electrically connected to the next adjacent cell by a conductive lead 16 which passes from within the anode 11 of one cell to contact both cathodes 13 of the next adjacent cell. The lead 16 is a sheet-form member, such as a metal gauze.

This form of battery may be produced by forming the anode 11 on both surfaces along one edge of a web of the lead 16. The outer surfaces of the anode 11 then have the absorbent layer 12 applied thereto. The cathodes 13 are applied on one side of the web, one adjacent the other edge and one spaced therefrom generally centrally of the web. The web is then cut into separate lengths and bent into generally S-form and the cells assembled into a battery as shown in FIG. 2.

In the types of cell illustrated, it is probable that some form of seal will be necessary to prevent excessive leakage or evaporation of electrolyte from the cell for certain applications where it is not possible to provide a reservoir of electrolyte. It could be arranged, for example, that some, if not all, of the edges of each cell are sealed around the anode, cathode and separator and the cell could be encased in a very simple manner in a plastics mounting with the cathode surface exposed for access to an oxidant gas. Feeder tubes may be provided for electrolyte to be fed to the cell and, possibly, replenished.

It is of interest to indicate that a further possible way of preparing a cell in accordance with the invention is to wrap a porous metal anode (such as zinc) with a silver gauze current collector in a wrapping of alkali-resistant asbestos or other heat-resistant separator material. The wrapping is then coated by dipping, painting, spraying or otherwise applying an acetone/water dispersion of a hydrophobic agent such as P.T.F.E. polytetrafluoroethylene and a suitable catalyst, such as a relatively cheap high surface area graphite powder. This graphite powder may be activated by silver or other oxygen reduction catalytic material. The catalyst is then dried, lightly rolled and thereafter cured at about 300° C. in a vacuum oven to remove the wetting agent. To improve electrical contact on the cathode catalyst, a metallic powder may be deposited, using conventional methods. Finally, a metal gauze current collector such as nickel, is wrapped round the whole structure, and this provides sufficient pressure to give electrical continuity.

The feasibility of this system has been demonstrated by a single bicell unit which ran for 10 hours at 10ma./cm.$^2$ and 1.2 volts full cell voltage, i.e., 66 percent Zinc utilization. It was also capable of supporting currents up to 50 ma./cm.$^2$ at 1 volt.

What is claimed is:

1. A method of making a metal/oxygen (air) battery comprising the steps:
   a. applying two spaced-apart cathode layers one adjacent one edge and the other generally centrally on one face of an air permeable sheet-form member of electrically conductive material;
   b. applying an anode layer on each surface, adjacent the other edge, of the sheet-form member;
   c. applying electrolyte-resistant absorbent material to the outer surfaces of the anode;
   d. folding the sheet-form member to a generally S-form configuration and interleaving with a further similarly folded sheet-form member so that the two cathode layers which face one another have the anode layers of the other member therebetween, and
   e. positioning an air permeable, electrically insulating separator between adjacent uncoated surfaces of the sheet-form members.

2. A method as claimed in claim 1 wherein the sheet-form members are produced by coating a web and then cutting the web into separate lengths to form the sheet-form members.

* * * * *